United States Patent [19]

Danielmeyer et al.

[11] 4,001,704
[45] Jan. 4, 1977

[54] LASER SOLAR CELL APPARATUS

[75] Inventors: Hans-Gunter Danielmeyer, Hofingen; Jean Pierre Jeser, Stuttgart; Walter-Wolfgang Kruhler, Stuttgart; Karl-Heinz Thiemann, Stuggart; Gunter Huber, Gerlingen, all of Germany

[73] Assignee: Max-Planck-Gesellschaft zur Forderung der Wissenschaften e.V., Gottingen, Germany

[22] Filed: Mar. 20, 1975

[21] Appl. No.: 560,149

[30] Foreign Application Priority Data

Mar. 25, 1974 Germany .......................... 2414209

[52] U.S. Cl. .................... 330/4.3; 331/94.5 P; 331/94.5 F; 350/96 R
[51] Int. Cl.² ........................................... H01S 3/02
[58] Field of Search .................. 330/4 13; 350/96 R; 252/301.4 P; 307/312; 331/94.5 P, 94.5 F, 94.5 D

[56] References Cited

UNITED STATES PATENTS

| | | | |
|---|---|---|---|
| 3,353,115 | 11/1967 | Maiman | 330/4.3 |
| 3,475,697 | 10/1969 | Griest | 330/4.3 |
| 3,577,095 | 5/1971 | Benner | 331/94.5 P |
| 3,786,370 | 1/1974 | Barry et al. | 331/94.5 P |
| 3,813,613 | 5/1974 | Danielmeyer et al. | 330/4.3 |
| 3,821,663 | 6/1974 | Brenner | 331/94.5 P |
| 3,863,177 | 1/1975 | Damen et al. | 331/94.5 F |
| 3,890,578 | 6/1975 | Wang | 331/94.5 P |

OTHER PUBLICATIONS

Danielmeyer et al., "Laser Pump Cavity with Conical Geometry," 8/71, pp. 1983–1984, Appl. Opt., vol. 10, No. 8.
Weber et al., "Nd–ultraphosphate Laser," 5/73, pp. 534–536, Appl. Phys. Lett., vol. 22, No. 10.

*Primary Examiner*—Nelson Moskowitz
*Attorney, Agent, or Firm*—Burgess, Dinklage & Sprung

[57] ABSTRACT

A highly doped optical amplifier in the form of a thin layer or fiber wherein the pump light is directed transversely to the surface of the layer or fiber. A transparent substrate is provided underneath the layer or fiber and a solar cell is provided in light receiving relationship to light passing through the layer or fiber on the opposite side of the substrate.

1 Claim, 9 Drawing Figures

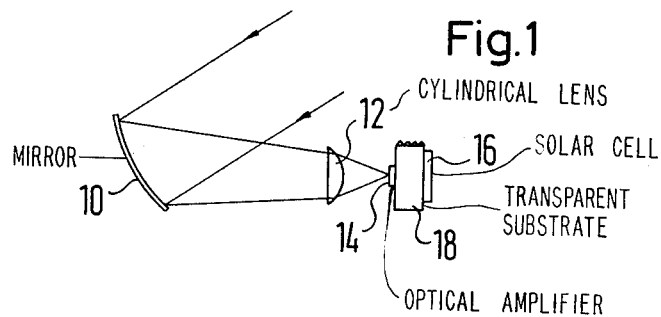
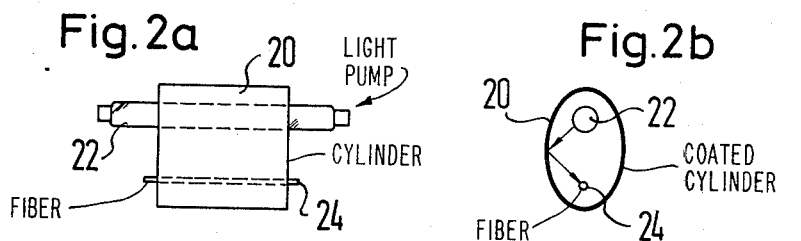
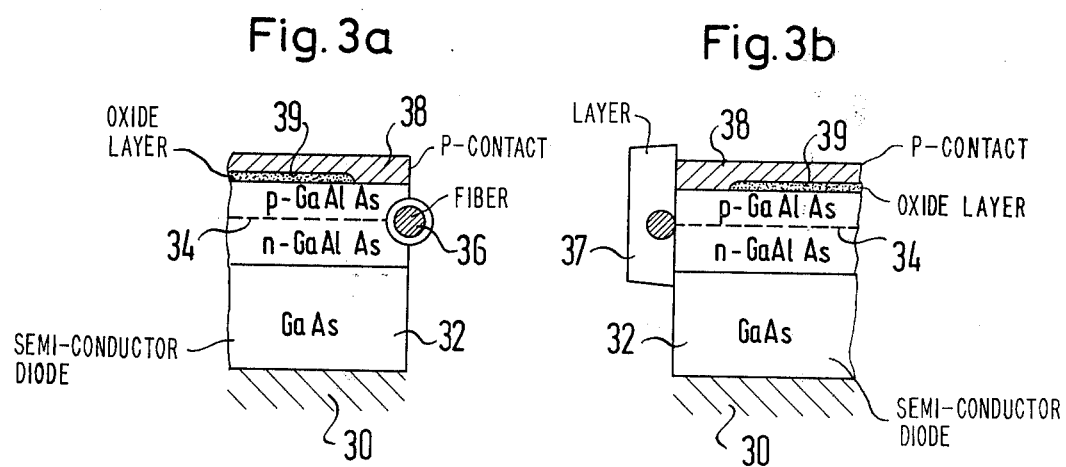

LASER SOLAR CELL APPARATUS

The German patent applications No. P 23 42 182.1, now DOS No. 23 42 182, and No. P 24 00 911.8, now DOS No. 2400911, describe production methods and the advantages of novel materials on the basis of ultraphosphate, which are also part of the disclosure of this present application. To be emphasized in this connection are the high optical amplification of some representatives of the ultraphosphates — e.g. $NdP_5O_{14}$ — as well as their high absorptive capacity for pump light, which makes it principally possible to excite ("pump") also optical amplifier elements present in the form of thin layers and fibers of these materials, such that they provide high optical amplification.

Up to now, there have been used as pump light sources for optical amplifier elements of such type lasers whose ray had been focussed parallel with respect to the ray from the optical amplifier element by means of a lens, so that a focal spot having a diameter of approximately 20 micrometers was generated. With such a "longitudinal" pump arrangement the pump ray has to be focussed to such a small face to get the full amplifying capacity. If the concentration of the active ions in the optical amplifier element is very high (e.g. in pentaphosphates it is up to 30 times higher than in doped laser materials such as Nd:YAG), the pump light must in addition be more intensive from the very beginning on than in case of conventional laser materials.

The necessity of such strong focusing means that the known arrangements require a laser already for the optical exciting of the laser rays. This is considerably disadvantageous, because pump lasers are expensive and — apart from some semiconductor lasers — require a lot of room and energy. The advantages (= inexpensive, small and economical) of high-doped optical amplifier elements, especially on the basis of ultraphosphate, can therefore not be fully utilized.

It is therefore the object of this invention to provide pump arrangements and combined optical construction elements which are adapted to high-doped optical amplifier elements, especially on the basis of ultraphosphate, so that one can get all the possible advantages.

One means for solving this problem is to be seen in the good absorptive properties of high-doped optical amplifier elements, especially on the basis of ultraphosphate. The high concentration of the active ions does not only mean high optical amplification per length unit, but also high optical absorption per length unit for the pump light. For example, for $NdP_5O_{14}$, the absorption length at 800 nanometers wave length is only approximately 50 micrometers, i.e. upon 50 micrometers depth of penetration 63 percent of the incident pumping capacity are absorbed. A layer having a thickness of 10 micrometers and carrying on one side a metallic or dielectric mirror with good reflecting properties absorbs already 27 percent of the incident pumping capacity.

Accordingly, it is a main object of this invention to make the pump light vertically incident to the layer or vertically onto the axis of the fiber respectively, i.e. to pump "transversely".

In principle, the pump ray may have any dimension in direction of the fiber axis or in the layer plane along the layer. This means that one does not have to focus to a diameter of 10 micrometers; the pump light may rather impinge upon the amplifier element in a strip of e.g. 10 micrometers width and up to some centimeters length. This gives an intensity of the required pump ray, which intensity (= capacity per outlet area) is lower by approximately three orders of size, i.e. for example approximately 1 W per $cm^2$, in comparision with 1 $kW/cm^2$ in the above example of the $NdP_5O_{14}$—laser with 1 milliwatt pump threshold at an outlet area of 10 × 10 micrometers.

An important point in connection with this reduction of the pumping intensity is that it is now also possible to use incoherent light sources as pump sources, which means e.g. the sun, or halogen lamps or luminescence diodes, because an emission of approximately 1 $W/cm^2$ is already possible with incoherent sources, whereas emissions of approximately 1 $kW/cm^2$ are mostly reserved for lasers.

Other features, additional objects, and many of the attendant advantages of this invention will readily be appreciated as the same becomes better understood by reference to the following description of a preferred embodiment when considered in connection with the appended drawing in which:

FIG. 1 shows a laser arrangement operated on sun light;

FIGS. 2a, 2b show a longitudinal view and a cross-sectional view of a laser arrangement to be operated on a glow-discharge lamp;

FIGS. 3a, 3b show laser arrangements which are to be operated on a light coming from a p-n junction; FIG. 3a for the event that the optical amplifier element is a fiber, FIG. 3b for the case that the amplifier element is a layer;

Figure 4A:
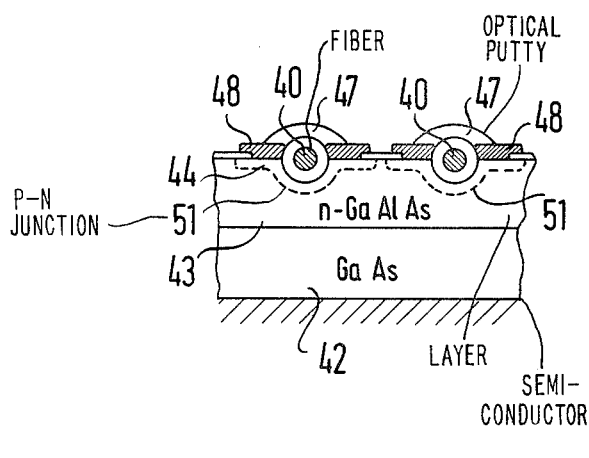
FIGS. 4a, 4b show laser arrangements having several fibers or layers respectively as optical amplifier elements which are operated on light coming from p-n junctions of a monolithic semiconductor body.

A radiation flux of 8 $W/cm^2$ flows from the sun onto the earth. For example, approximately one thousandth thereof, i.e. $I_Q = 10$ $mW/cm^2$, can be used for the neodymium absorption. To reach 1 $W/cm^2$ one requires a ray focussing by a factor $10^2$. This means that in case of mirror or lens arrangements one has to increase the diameter of the inlet opening for the sun light at least 10 times than the diameter of the layer to be pumped. If the optical amplifier element has the shape of a layer or of a fiber, it is of advantage — as according to FIG. 1 — to apply a combination of mirror 10 and cylinder lens 12 or cylinder mirrors. The mirror 10 focuses to the length and the cylinder lens 12 (respectively the cylinder mirror) additionally to the width of the layer 14. If the width of the layer is 0.1 mm — and this is still a very considerable width — a cylinder lens having a width of approximately 1 cm is sufficient.

The functions of mirror 10 and cylinder lens 12 can be taken over also by only one single suitably shaped mirror.

Since the laser-active meterial of the optical amplifier element is mostly absorbing only a small part of the sun light, the major part of the light can furtheron be used for the generation of current in the solar cells 16 which are preferably provided on the back side of the transparent substrate 18 for the layer 14. Therefore, a combination of a focusing system 10, 12 laser-active layer 14, transparent substrate 18 and solar cell 16, as illustrated in FIG. 1, is of advantage. Such a combination is especially useful for satellite communication. The solar cell 16 may e.g. be subdivided in quadrants which make it possible to adjust the optical system 10, 12 towards the sun and to stabilize the system.

These light sources can emit approximately 100 W/cm$^2$ at the source in an angular aperture of 90°. Since only a small portion of the total radiation falls into the pump bands of the material of the optical amplifier element (e.g. only 10$^{-2}$ into the pump bands of neodymium), one is close to the pump threshold with these lamps. (In case of flash illumination glow-discharge lamps can however generate considerably higher luminous density; however the flash rates are too slow for most of the useful systems). Tungsten halogen lamps have good pumping properties only in the ultra-red range up to the remote red, because the melting point of tungsten defines the attainable color temperature.

On account of the relatively small luminous density, special arrangements are to be chosen for these lamps, arrangements wherein the emitting face is as small as possible so that the pump radiation can be focused, if possible completely, onto the laser-active material. FIGS. 2a and 2b show such an arrangement. In the axes of an inwardly mirror-coated elliptic cylinder 20 are provided a pump lamp 22 and the active material 24 to be pumped — which is in this example preferably a fibrous one. Such pump arrangements have already become known for some time. In this case, it is however important to have also very small dimensions of the pump lamp vertically to its axis to cope with the small dimensions of the active material vertically to the axis of the laser light. Accordingly, this invention suggests the use of capillary glow-discharge lamps or tungsten lamps which have a simple straight wire of about 0.1 mm diameter or a stretched coil respectively having a diameter of 0.1 mm. Thus, the required electric pumping capacity of the lamps is reduced so that no water cooling is necessary for the heat flow. Preferably the lamps should be easy to exchange because they have a limited lifetime.

FIGS. 3a and 3b show as pump light source a semiconductor diode 32 arranged on a heat conductor 30, said semiconductor diode consisting preferably of a GaAlAs-material being such in its composition that the radiation emitted in a p-n junction fits with the Nd-pump band at 800 nanometers. The establishment of such p-n junctions has become known from the semiconductor technique. The luminous density attainable with luminescence is far above the 1 W/cm$^2$ required e.g. for neodymium ultraphosphate. In case of laser diodes wherein parallel to the p-n junction coherent light, i.e. light which is very narrow-banded and which has a great directivity, is emitted, the luminous density is even above 1 MW/cm$^2$.

To achieve a high luminous density along the fiber 36 or the layer 37 at a low current load of the luminescence diode, the p-contact 38 which is preferably made free diffused gold is formed as a strip contact (normally to the drawing plane) and isolated by an oxide layer 39 along the major part of the diode 32.

The laser radiation is directed normally to the drawing plane and lies in the hatched cross-sectional views of the fiber 36 or the layer 37 respectively.

Figure 4B:
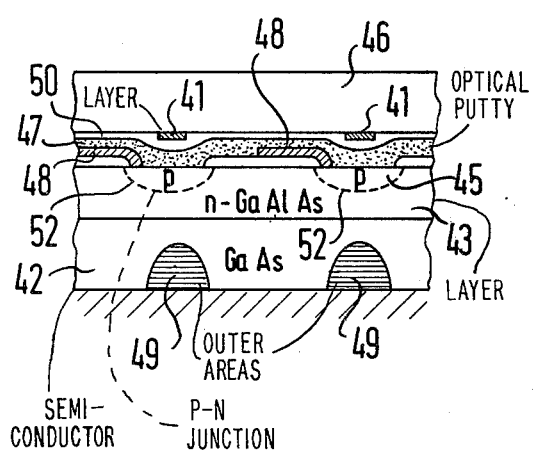

FIGS. 4a and 4b show two arrangements which are suitable for several active fibers 40 or layers 41. In these arrangements the formation of p-n junctions 51, 52 is done by diffusing into the n-layers 43 of semiconductor bodies 42 several p-conductive strips 44, 45 which are parallel to fibers 40 or layers 41 when regarded normally to the drawing plane. These arrangements are possible for luminescence diodes wherein light emitted substantially vertically to the p-n junctions is to be used for the pumping. Before the diffusion nearly semicylindrical trenches are etched into the n-layer 43 wherein the fibers 40 are embedded. Preferably the layers 41 may be pre-fabricated on substrates 36 and be covered e.g. by a glass layer 50. Fibers 40 as well as layers 41 are fixed to the semiconductor bodies 42 by means of a suitable optical putty 47 (e.g. epoxide resin, suitable vitreous arsenic sulfide on account of the higher refractive index, etc.). Typical orders of size are some millimeters to centimeters and tenth millimeters distance between the fibers 40 or layers 41 respectively. Strip contacts 48 may be connected individually to enable individual control of the amplification. To increase the field concentration within the range of the active layers 41, the outer areas 49 of the semiconductor body 42 are, next to these layers 41, preferably filled with a metal such as Zn or Au.

Figure 5A:
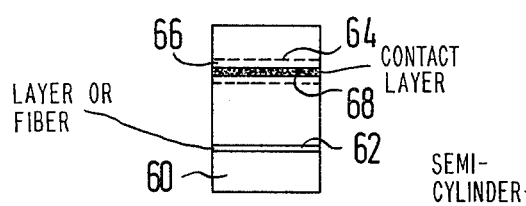
FIGS. 5a, 5b show a view and a cross-sectional view of a laser arrangement having a specially shaped semiconductor body with an adjoining fiber or layer as the optical amplifier element and with an elongated p-n junction as the light source.
Figure 5B:
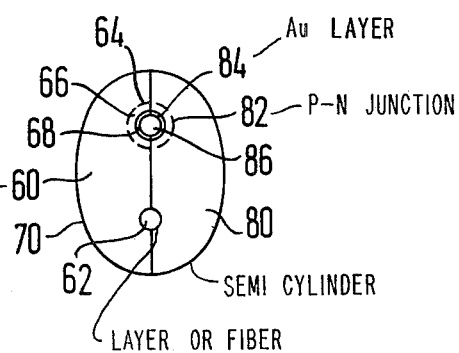

FIGS. 5a and 5b show an arrangement which allows optimum utilization of the semiconductor luminescence. In this embodiment the good characteristics of imaging of an elliptic semicylinder 60 is combined with the possibility to make the p-n junction vary narrow.

The semicylinder 60 consists of semiconductor material. The layer or the corresponding fiber is positioned in the one focal line of said semicylinder 60. A light-emitting p-n junction 64 is provided next to the other focal line of said semicylinder 60. In the present example the semiconductor material is n-GaAlAs into which a p-layer 66 is diffused semicircularly along said second focal line and provided with an outer golden contact layer 68. The rounded outer face of the semicylinder 60 is polished and covered by a layer 70 which reflects the light that is characteristic for the fiber or layer 62 and that comes from the p-n junction 64.

In this embodiment the semicylinder 60 is supplemented by a symmetric second semicylinder 80 having a light-emitting p-n junction 82 adjacent the p-n junction 64 of said semicylinder 60 and feeding pump light to the layer or fiber 62 from the other side. The p-n junction 82, too, is contacted with a gold layer 84. Both contact layers 68, 84 are semicylindrical and encloses a connection wire 86. Each half of said fiber 62 or layer is embedded in each of said semicylinders 60, 80.

The described arrangements are not restricted to semiconductor elements on GaAS-basis. Important is only that the recombination radiation of the semiconductor corresponds with one or more absorption lines of the laser material.

What is claimed is:
1. A laser arrangement for a high-doped optical amplifier element wherein said optical amplifier element has the form of a thin layer or fiber, and wherein a light pump is directed onto said layer or said fiber generally transversely to a surface of said layer or to the longitudinal axis of said fiber said layer or said fiber being provided on a transparent substrate, a solar cell being provided on the back side of said substrate in light receiving relationship to light passing through said layer or fiber.

* * * * *